United States Patent
Norris et al.

[11] Patent Number: 5,482,433
[45] Date of Patent: Jan. 9, 1996

[54] INTEGRAL INNER AND OUTER SHROUDS AND VANES

[75] Inventors: James W. Norris; Alfred P. Matheny, both of Jupiter, Fla.

[73] Assignee: United Technologies Corporation, Hartford, Conn.

[21] Appl. No.: 372,718

[22] Filed: Jan. 13, 1995

Related U.S. Application Data

[63] Continuation-in-part of Ser. No. 155,965, Nov. 19, 1993, abandoned.

[51] Int. Cl.⁶ .................................................. F01D 9/04
[52] U.S. Cl. .................. 415/173.7; 415/200; 415/210.1
[58] Field of Search ............................ 415/173.7, 200, 415/208.2, 209.3, 209.4, 210.1

[56] References Cited

U.S. PATENT DOCUMENTS

| | | | |
|---|---|---|---|
| 2,868,439 | 1/1959 | Hampshire et al. | 415/200 |
| 2,917,276 | 12/1959 | Klompas et al. | 415/210.1 |
| 3,069,135 | 12/1962 | Welsh | 415/209.4 |
| 3,079,128 | 2/1963 | Burge | 415/200 |
| 3,118,593 | 1/1964 | Robinson et al. | 415/200 |
| 3,275,294 | 9/1966 | Allen et al. | 415/137 |
| 3,393,862 | 7/1968 | Harrison | 415/209.3 |
| 3,588,267 | 6/1971 | Wilkinson et al. | 415/210.1 |
| 4,655,682 | 4/1987 | Kunz et al. | 415/209.4 |

FOREIGN PATENT DOCUMENTS 2113772  8/1983  United Kingdom ............... 415/209.4

Primary Examiner—Edward K. Look
Assistant Examiner—James A. Larson
Attorney, Agent, or Firm—Norman Friedland

[57] ABSTRACT

The inner shroud of the vane of a vane assembly for the compressor section of a gas turbine engine is fabricate from a composite material preferably imide resin reinforced with carbon fibers and is formed into an open ended box-like member segment supporting no less than two vanes or airfoils. The segments are interlocked by a necked down edge adapted to slip into the open end of the adjacent inner shroud of the stator vane that serve to seal the gas path and provide damping. Rub strips are integrally formed on the bottom surface of the inner shroud.

10 Claims, 2 Drawing Sheets

INTEGRAL INNER AND OUTER SHROUDS AND VANES

This invention was made under a U.S. Government contract and the Government has rights herein.

This is a continuation-in-part of application Ser. No. 08/155,965, filed Nov. 19, 1993, abandoned.

TECHNICAL FIELD

This invention relates to stator vanes for gas turbine engines and particularly to a composite vane and the its inner shroud.

BACKGROUND ART

U.S. Pat. No. 3,275,295 granted on Sep. 27, 1966 to J. M. Allen and A. J. Scalzo entitled "Elastic Fluid Apparatus" discloses a box-like element on the inner diameter of the stator vane that when assembled define an annular vane construction for a gas turbine engine. The inner shroud or base portions carries interlocking means for interlocking adjacent vanes. The fit of the interlocking means is such that it provides damping. A band formed from relatively thin strip rigidly connects to each of the base members to hold them in frictional engagement relative to each other while permitting radial expansion. The method of bonding the thin strip to the base member is by welding which would require that each of the members are metallic.

As is well known in the aeronautical art, it is highly desirable to reduce the weight of engine component parts inasmuch as such a reduction translates into fuel savings and/or greater payload capacity. One area that has proven to lend itself to being fabricated from composite materials is the fan/compressor section of the engine. Since this area during aircraft operations can become relatively warm and encounter extremely high stresses, only certain composite materials have proven to be satisfactory for this environment. One of the materials that have proven to exhibit satisfactory characteristics is the imide resin and carbon fiber family of composite materials. However, because of the characteristics of this material, fabrication of the vane has been particularly difficult.

I have found that a vane can be satisfactory fabricated by forming the vane in segments comprising the inner shroud, outer shroud and at least two and perhaps three airfoils extending between the inner shroud and outer shroud. The airfoils of the stator vane are fabricated into a solid body with an integral hollow box-like structure formed at the base of the vane to define the inner shroud. The box-like structure carries a pair of opposing side walls a bottom wall and top wall and the ends are void to define an annular cavity when the segments are assembled in a ring like stator vane. One end of the hollow box-like element is necked down to fit into the end of the adjacent segment. This construction forms an extremely light weight assembly and doesn't require any additional structural supports as is the case of heretofore known assemblies.

Also, circumferential tracks formed from a suitable abradable material is permanently affixed to the inner diameter of the inner shroud and when assembled mates with the knife edge sealing elements of the labyrinth seal carried by the rotating shaft.

DISCLOSURE OF INVENTION

An object of this invention is to provide a composite stator vane for a gas turbine engine that includes a vane segment that includes at least a pair of circumferentially spaced solid airfoil vanes and an integral hollow box-like inner shroud. The inner shroud defines an annular cavity and includes a necked down end to snugly fit into the end of the adjacent segment and define an interlocking assembly of segments.

Another feature of this invention is the circumferentially shaped rub strips formed on the bottom wall of the integral shroud that are adapted to engage the tooth or teeth of the labyrinth seal formed with the rotating assembly.

Another feature of this invention is that the integral shroud as defined may be either formed as unitary molded unit or it may be formed independently and bonded thereto to form an integral segment.

Another feature of this invention is that the fit between adjacent segments provides sufficient surface contact at the mating Joints to perform a damping function.

The foregoing and other features of the present invention will become more apparent from the following description and accompanying drawings.

BEST MODE FOR CARRYING OUT THE INVENTION

Figure 1:
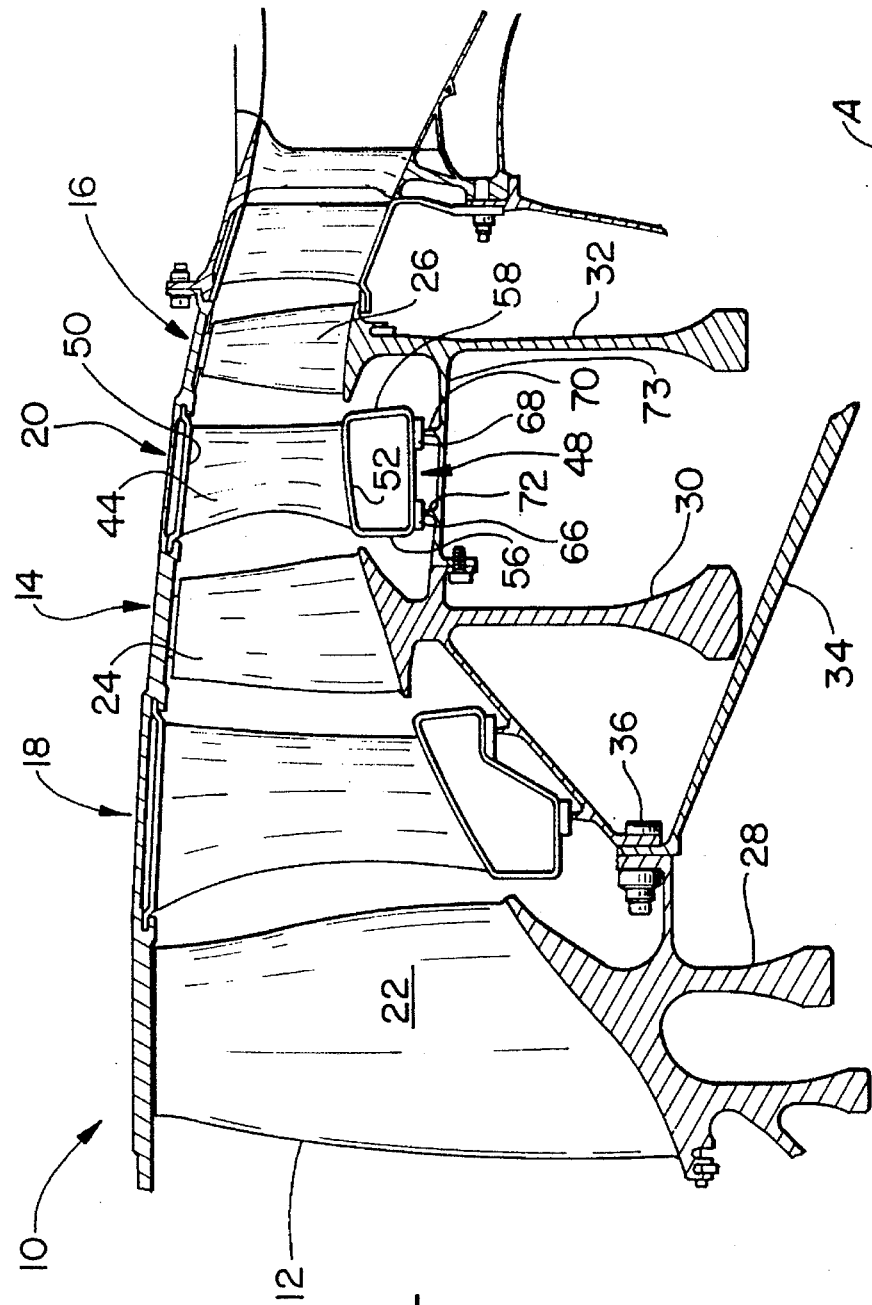
FIG. 1 is a partial view in section of a compressor section including the vanes utilizing this invention of a gas turbine engine.
Figure 2:
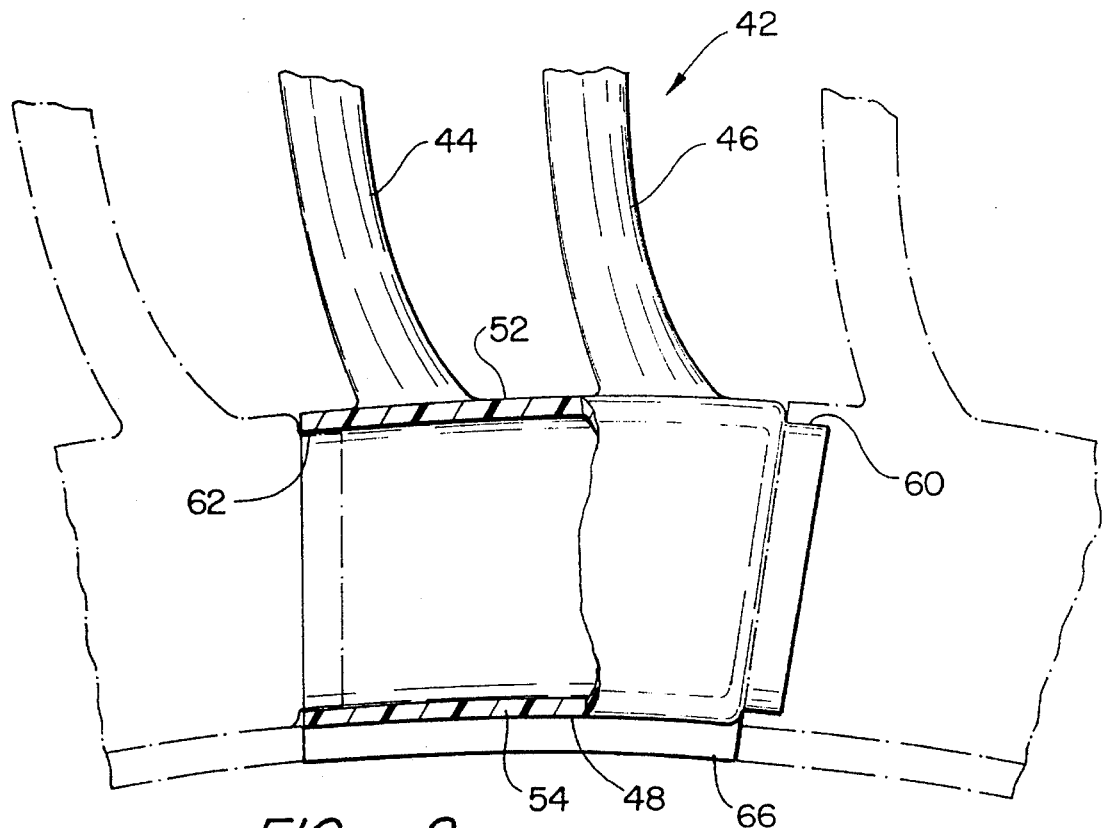
FIG. 2 is an enlarged side view partly in section of the vane constructed in accordance with this invention.
Figure 3:
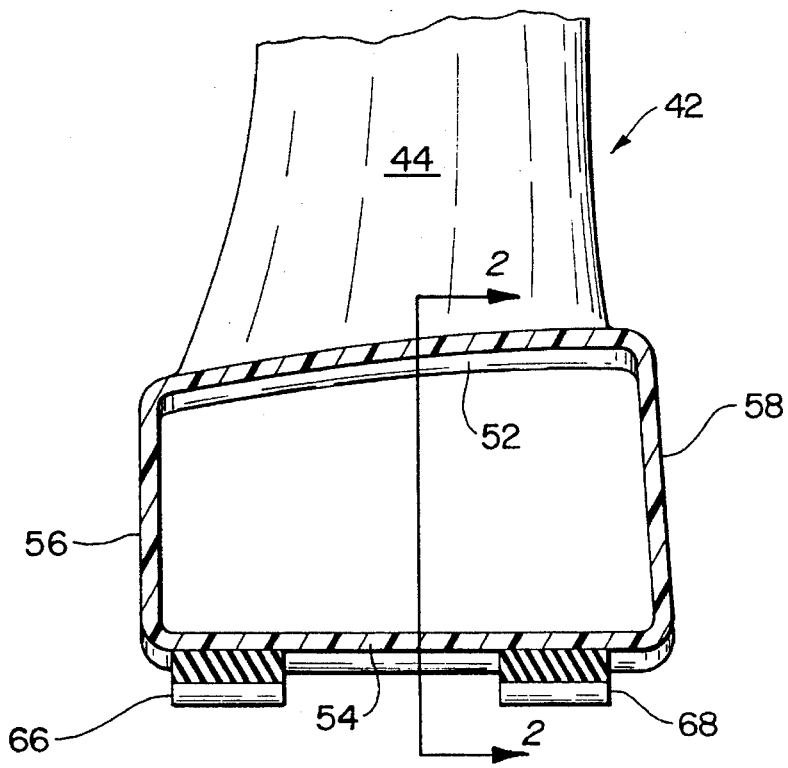
FIG. 3 is a partial view in section and phantom taken along lines 3—3 of FIG. 2 showing the details of this invention.

This invention can best be understood by referring to FIGS. 1–3 that show a portion of a compressor section of a gas turbine engine in section generally indicated by reference numeral 10. Compressor casing 11 housing a portion of the compressor stages and for illustration purposes of this invention show three compressor rotors 12, 14, and 16, and their complimentary stator vane assemblies 18 and 20 (only two being shown). The compressor rotors 12, 14, and 16 comprise the blades 22, 24 and 26 that are circumferentially spaced and supported to or made integral with the respective rotor disks 28, 30 and 32, respectively, in a well known manner. The rotor disks are, in turn, suitably supported to engine shaft 34 by a plurality of nut and bolt assemblies 36 (one being shown) for rotational movement about the engine's axis A. Vane assemblies 18 and 20 consists of a plurality of segments generally indicated by reference numeral 42 that consists of two vanes or airfoils 44 and 46 extending from the inner shroud 48 to the outer shroud 50. Each of the segments is mounted end to end to form a ring of spaced airfoils surrounding the engine axis A and serve to direct the engine's working medium into the respective compressor blades. For the purpose of this disclosure and for the sake of convenience and simplicity only a single stage of the multiple stages of compressors stages will be described hereinbelow. For this purpose vane assembly 20 has been selected to serve as an example of all the other vane assemblies employing this invention.

As mentioned in the above, the stator assembly is fabricated from a non-metal material which consists of a suitable composite material that is capable of withstanding the heat and loads encountered in aircraft engine operation. A suitable material and preferable in this embodiment is imide resin reinforced with carbon fibers. While not a part of this invention it should be understood that the fibers are formed in a cloth-like material that is layered to define the stator assembly and then with the use of a suitable adhesive is molded into the desired configuration. It is important from the standpoint of understanding this invention that each segment carries no less than two stator vanes and could carry as many as three stator vanes. Each segment includes the box-like inner shroud 48 that consists of the upper wall 52, the bottom wall 54 and the opposing front face and back face walls 56 and 58, respectively. In the preferred embodiment the inner shroud 48, outer shroud 50 and the airfoils or vanes 44 disposed therebetween are molded in an integral segment. Hence, each segment of the stator vane assembly is mounted end to end to define the annular or toroidally shaped stator vane that surround the engine's shaft 34.

In accordance with this invention the side edges 60 and 62 are opened so that when assembled they define an annular open channel. Side edge 60 of each segment is necked down to a prescribed dimension in order to fit into the open ended channel of the adjacent segment as shown in FIG. 2. The fit of the necked down edge 60 is such that there is a sliding motion between the mating faces that produces sufficient friction to dampen the vibratory motion encountered. This mating of the adjacent segments assures sufficient sealing to prevent leakage of the engine's working medium.

The construction of the vane assembly incorporating this invention not only eliminates the need of additional support as the thin band support described in U.S. Pat. No. 3,275,294, supra, it also lends itself for supporting the rub strips that are typically employed in gas turbine engines to seal the shaft and its working cavity from the gas path. As shown in all the Figs. the rub strips 66 and 68 are integrally molded on the bottom surface of the bottom wall 54 of the inner shroud 48 and define circular sealing elements that engage with the knife edges 70 and 72 extending from the disks support member 73. Since the inner shroud is integral with the vane assembly and no means are necessary for attaching the airfoil and shroud assembly, a reduction in weight is realized which contributes to the overall improvement in engine performance.

While the inner shroud 48 is configured in a rectangular shape, the construction of the vane assembly incorporating this invention lends itself to be formed in other similar shapes or quasi-like rectangular shapes. This is illustrated in the vane assembly 18 of FIG. 1 which shows the bottom wall to be stepped to accommodate the sealing of an angular shaped disks attachment member. It is to be understood that the term "box-like" as defined in this disclosure, includes configurations that are other than rectangular shaped members as is shown in FIG. 1. It should also be understood that while in its preferred embodiment the box-like portion of the inner shroud is molded as a unitary element of the vane assembly, it could be molded as a separate element and bonded to the vanes.

What has been shown by this invention is a compact and simplified integral vane and inner shroud assembly that includes inherent sealing and damping features, while eliminating the need for the complicated and multi-component support structure that has been typically employed in heretofore known designs. This invention also includes integral rub strips that may be of the abradable type typically employed in current gas turbine engines. The construction of the vane assembly in accordance with this invention results in a weight reduction, is easier to assemble and reduces the number of components typically associated with this portion of the gas turbine engine.

We claim:

1. A stator having a row of spaced airfoils for passing engine fluid working medium in a gas turbine engine, an outer case, a plurality of inner shroud arcuate segments mounted end to end to form a ring, a plurality of outer shroud arcuate segments mounted end to end to form another ring concentrically disposed to said ring, at least a pair of airfoils attached to each of said inner shroud arcuate segments and said outer shroud arcuate segments to collectively define said row of spaced airfoils, the outer shroud arcuate segment of each of said pair of airfoils attached to said outer case for collectively supporting said row of spaced airfoils, each of said inner shroud arcuate segments, each of said outer shroud arcuate segments and said pair of airfoils molded from a single piece from a composite material, said inner shroud segment configured into a box-like structure radially extending from the inner end of said pair of airfoils, said box-like structure including a top wall joined to the inner end of said pair of airfoils, a bottom wall, and a pair of opposing parallel side walls, said top wall, said bottom wall and said pair of opposing parallel side walls defining an open ended channel aligned to form an annular shaped passageway in said ring, and means formed on the ends of the open ended channel for interlocking adjacent inner shroud arcuate segments.

2. A stator as claimed in claim 1 wherein said material is taken from the group consisting of carbon fibers and imide resins.

3. A stator as claimed in claim 2 wherein said gas turbine engine includes a compressor section, said outer case defines a portion of said compressor section of said gas turbine engine.

4. A stator as claimed in claim 3 wherein said interlocking means includes a necked down portion formed on one end of said open ended channel of each adjacent box-like structures.

5. A stator as claimed in claim 4 wherein said necked down portion fits into the open ended channel of the adjacent inner shroud arcuate segments, and being in sliding relationship thereto, whereby the cooperation of said necked down portion and the open ended channel dampen vibratory energy imposed on said stator.

6. A stator as claimed in claim 4 wherein said gas turbine engine includes a main shaft at least one rub strip supported to the outer face of said bottom wall and circumferentially aligned to define a circular member and adapted to engage a sealing element attached to said main shaft of said gas turbine engine.

7. A stator as claimed in claim 4 wherein said box-like structure is rectangularly shaped.

8. A stator as claimed in claim 4 wherein said box-like structure is irregularly shaped.

9. A stator as claimed in claim 4 wherein said box-like structure includes a forward portion and an adjoining rearward portion and said forward portion and said rearward portion being in stepped relationship relative to each other.

10. A stator as claimed in claim 6 wherein each of said at least one rub strip is integrally formed with each of said inner shroud arcuate segments.

* * * * *